United States Patent [19]

Gee et al.

[11] 3,962,882
[45] June 15, 1976

[54] METHOD AND APPARATUS FOR TRANSFER OF LIQUEFIED GAS

[75] Inventors: David E. Gee, Tarporley; Robert V. Worboys, Chester, both of England

[73] Assignee: Shell Oil Company, Houston, Tex.

[22] Filed: Sept. 11, 1974

[21] Appl. No.: 505,128

[30] Foreign Application Priority Data
July 24, 1973   United Kingdom............35195/73

[52] U.S. Cl. ..................... 62/55; 141/82; 141/388
[51] Int. Cl.² ......................................... F17C 7/02
[58] Field of Search .............. 62/55; 141/82, 387, 141/388

[56] References Cited
UNITED STATES PATENTS 2,964,918   12/1960   Hansen et al. .......................... 62/55
3,456,451   7/1969   Roberson, Jr. .......................... 62/55
3,797,262   3/1974   Eigenbrod ............................... 62/50

FOREIGN PATENTS OR APPLICATIONS 2,127,241   10/1972   France .................................. 62/55

Primary Examiner—William F. O'Dea
Assistant Examiner—Ronald C. Capossela
Attorney, Agent, or Firm—Ronald R. Reper

[57] ABSTRACT

A method and apparatus for transferring a liquefied gas from a first container into a second container without removal of vapor from the second container is disclosed.

5 Claims, 2 Drawing Figures

METHOD AND APPARATUS FOR TRANSFER OF LIQUEFIED GAS

BACKGROUND OF THE INVENTION

The present invention relates to a method of loading a liquefied gas from a first container into a second container without removal of vapor from the second container and to apparatus for use therewith.

The invention relates particularly to the filling of fuel storage tanks on vehicles propelled by engines adapted to operate on liquefied gaseous fuel. Such fuels include for example liquefied natural gas (L.N.G.), liquefied petroleum gas (L.P.G.) and liquefied hydrogen.

While it is accepted that the use of a gaseous fuel in an engine offers many attractive advantages, for example such fuels are clean, non-toxic, have a high calorific value and upon combustion yield a lower proportion of potential pollutants than conventional petroleum fuels, one disadvantage of these materials is their low density. To make available a convenient amount of gas in a limited spaced it is necessary to resort to either very high pressure storage or liquefaction. The most accepted method of storing and transporting bulk quantities of gaseous materials is in the liquefied form and it is in this form that such fuels will be most likely stored on vehicles.

Storage of liquefied gases is preferably carried out in double walled vacuum-type containers having the vacuum space between the two walls filled with a material that inhibits radiation such as perlite insulation. Although the insulation of such containers is very efficient there is still some leakage of heat to the contents with time and consequently some production of vapor. This effect is enlarged when the container is a storage tank supplying fuel to an engine wherein the tank surface area to volume ratio is high and wherein the level of the liquid contents gradually drops as fuel is used up and the vapor space above increases.

An added inconvenience is that when liquefied gas from a bulk storage container is loaded into such a container some vaporization takes place of the delivered material because some intermediary fittings are at ambient temperature or the delivered or stored material as a result of temperature differences between them.

When containers for liquefied gases are filled care has to be taken that vapor therefrom is not discharged into the atmosphere both from the point of view of safety and the fact that the vapor is a loss that the customer has paid for. Present methods necessitate the use of closed circuit systems of conduits having provision for the evacuation of vapor from the container to be filled prior to or during delivery of liquefied gas and for the removal of the vapor to separate containers, which may also be the vapor space within the bulk storage container from which the liquefied gas is being withdrawn.

The above methods have several drawbacks, in particular, vapor extraction or pressure balance must take place before a filling procedure, the return of vapor through the systems and into the bulk storage container tends to increase the temperature and therefore the pressure within the first container.

The present invention therefore provides a method of loading a liquefied gas from a first container into a second container without removal of vapor from the second container.

SUMMARY OF THE INVENTION

According to the present invention a method of loading a liquefied gas from a first container into a second container without removal of vapor from the second container comprises the following sequential steps:

a. cooling a multiple part conduit having a disconnectable coupling between two parts thereof by removing liquefied gas from said first container, pressurizing the removed liquefied gas and returning the so pressurized liquefied gas to said first container through said conduit;

b. breaking said conduit at the coupling thereof into first and second parts and establishing communication between said first container and said second container through the first part of the cooled conduit while closing off the second part thereof; and c. transferring liquefied gas under pressure from said first container to said second container through said first part of said conduit.

According to a further development of the method, when the desired quantity of liquefied gas has been transferred to said second container, said first conduit part is removed from said second container and said first and second conduit parts are reunited, while opening the second part thereof, whereafter cooling of said conduit in accordance with step (a) above is resumed.

The invention further provides an apparatus suitable for carrying out the method of claim 1 which comprises:

a closed container for liquefied gas, pump means in communication with said container and adapted for pressuring liquefied gas from said container into a multiple part conduit having an inlet in communication with said pump means, said conduit having a disconnecteable coupling between two parts thereof which when the two parts are coupled said conduit has an outlet in communication with said container and when said parts are disconnected the first inlet part in communication with the pump means is adapted for connection to a second container and second outlet part in communication with said container carrying valve means for closing said second part of the conduit when said parts are disconnected.

DETAILED DESCRIPTION OF THE INVENTION

Figure 1:
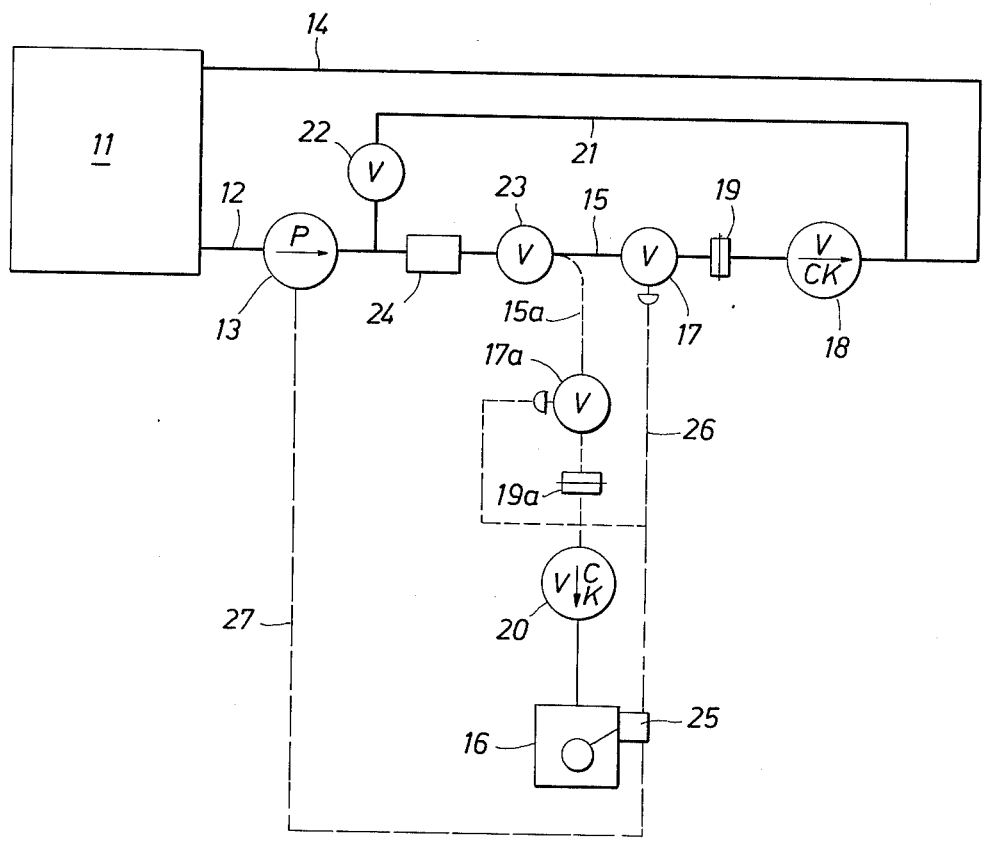
FIG. 1 of the drawings is a schematic diagram of a liquefied gas transfer system embodying the principles of the invention.

Liquefied gas stored in the first container is initially at a temperature corresponding to its boiling point at the pressure prevailing in the container. The removal of a quantity of liquefied gas from the container and pressurizing it by a pump to a pressure above its saturation pressure at the said temperature produces in the pressurized liquefied gas a degree of supercooling.

Circulation of supercooled liquefied gas through the conduit facilitates cooling of the conduit with a minimum of vapor production. Vapor from the conduit is removed into the first container.

So that the highest degree of supercooling may be obtained for the minimum pumping pressure it is desirable that the pressure within the first container be maintained as low as practical. This is facilitated by elimination of vapor from the vapor space within the container. Vapor from the vapor space within the first container may be reliquefied.

On connection of a part of the conduit to a second container, which is to be refilled and which contains a quantity of liquefied gas at a temperature corresponding to the boiling point of the liiquefied gas at the pressure prevailing in the container, together with vapor in the vapor space above the liquefied gas, for example the fuel tank of an engine adapted to operate on liquefied gaseous fuel, and closing off of the remainder of the conduit, supercooled liquefied gas can be delivered into the second container under pressure.

When the supercooled liquefied gas is delivered into the second container containing the liquefied gas together with its vapor the first effect is the production of a quantity of extra vapor, however, because of the increased enthalpy of the supercooled material, the vapor produced, together with some of the vapor already in the container recondenses, with the overall effect that the volume of liquefied gas in the container and thereby the pressure in the container is increased without the overall generation of an excess of vapor which must otherwise be removed. By controlling the degree of supercooling imposed on the liquefied gas being delivered the final temperature and pressure of the material remaining in the second container after termination of the delivery can be optimized.

After termination of the delivery it is desirable that the circulation of liquefied gas from the first container through the conduit be resumed. This procedure facilitates the continuous use of the system enabling frequent and varied individual deliveries to a single container or to a variety of different containers as required.

From the above explanation of the invention it will be understood that while circulation of liquefied gas through the conduit can be carried out at a comparatively low pressure, the delivery of liquefied gas having a suitable degree of supercooling into the second container, will preferably be carried out at a comparatively high pressure. To facilitate this two separate pumps can be employed, one operating at a lower pressure being used during the circulating step and the other operating at a higher pressure being used during the actual delivery of liquefied gas to the second container. Preferably a single pump adapted to operate at a plurality of different speeds is employed. To obtain optimum efficiency a variable-speed pump as above, further adapted to operate submerged in the liquefied gas in the first container, will be employed, an operating speed being selected appropriate to the step being performed.

In order that the pumping of liquefied gas from the first container can be carried on continuously while a connection is made between the conduit and the second container, by-pass means can be provided to allow liquefied gas in the conduit to by-pass the connection and return to the first container, this means can be closed off after the connection has been made and while the liquefied gas is being delivered into the second container.

The quantity of liquefied gas present in the second container may be determined by any suitable detector. We have found that the most suitable detector is one which detects the level of liquid within the container. Such a detector can be adapted so that when a predetermined level is reached a signal is generated which initiates automatic termination of the delivery, for example by closing a solenoid valve in the delivery connection.

The quantity of liquefied gas being delivered from the first container into the second container through the conduit and the connection can be measured by means of a flow meter arranged in the circuit. We have found the most accurate to be a turbine flow meter arranged in the conduit and adapted to record only during the delivery period.

The invention will be further described, by way of example, with reference to the accompanying drawings in which:

FIG. 1 shows in diagrammatic form a system suitable for use with the method of the present invention in filling liquefied gas fuel tanks associated with engines adapted to run on liquefied gas fuel.

The system, shown in FIG. I, comprises a first container 11, from which liquefied gas can be withdrawn through conduit 12, to be pressurized in two-speed pump 13, and a further conduit 14, through which liquefied gas can be returned to the first container 11. A connecting means 15, is provided comprising a conduit through which liquefied gas can be delivered into a second container 16, which may be the fuel tank referred to above, connected thereto. A solenoid valve 17 is provided in the connecting means to enable the delivery to be terminated when a desired quantity of liquefied gas is present in the second container 16, and a cryogenic check valve 18 is provided in the return conduit 14, whereby this conduit can be closed off during delivery of liquefied gas to the second container 16 through the connecting means 15. A quick screwed coupling 19, is provided in the connecting means 15, which enables the latter to be used as part of the conduit during the initial circulation of liquefied gas through the system, and then allows the connecting means to be swiftly disconnected from the system at the check valve 18, and connected to the second container 16, prior to delivery of liquefied gas thereto. The check valve 18 automatically seals off the rest of the conduit.

The connecting means is shown in its position connected to the second container 16, in broken lines, and the conduit is identified as 15a, the solenoid valve as 17a and the quick screwed coupling as 19a. The second container 16 is fitted with a cryogenic check valve 20 which acts similarly to the other, 18, to close off the container after the quick screwed coupling 19 (19a) has been disconnected from the container after delivery of the liquefied gas thereto.

A by-pass means 21 is provided to enable liquefied gas to be circulated through the remainder of the conduit while the connecting means 15 (15a) is being connected to the second container 16. A stop valve 22 is provided in the by-pass means 21 to enable it to be closed off when not required, and a further stop valve 23 is provided just before the connecting means 15 (15a) to enable the latter to be closed off from the rest of the conduit when the by-pass means 21 is in use.

A flow meter 24 is provided in the conduit 14 to facilitate measurement of the flow of liquefied gas into the second container 16 during the delivery. A liquid level detector 25, is provided within the container 16 to detect the level of liquid therein and a signal from this is used, through connection 26, to operate the solenoid valve 17 (17a), when a desired level has been attained. The signal, as shown, can also be used to control the speed of the two-speed motor 13, through the connection 27.

Although not shown in the attached drawings, it will be understood that, as a safety measure, vent valves will be installed in any system according to the present invention as positions where closure of stop valves could result in excessive pressure being developed.

As described above the invention relates to the filling of a second container with liquefied gas from a first container. It is further intended that the invention should be applicable to multi-point filling systems wherein liquefied gas from a central bulk-storage container can be dispensed into a plurality of further containers through a series of individual connections. Such a system can be a retail outlet for the refuelling of vehicles propelled by motors adapted to operate on liquefied gas.

Figure 2:
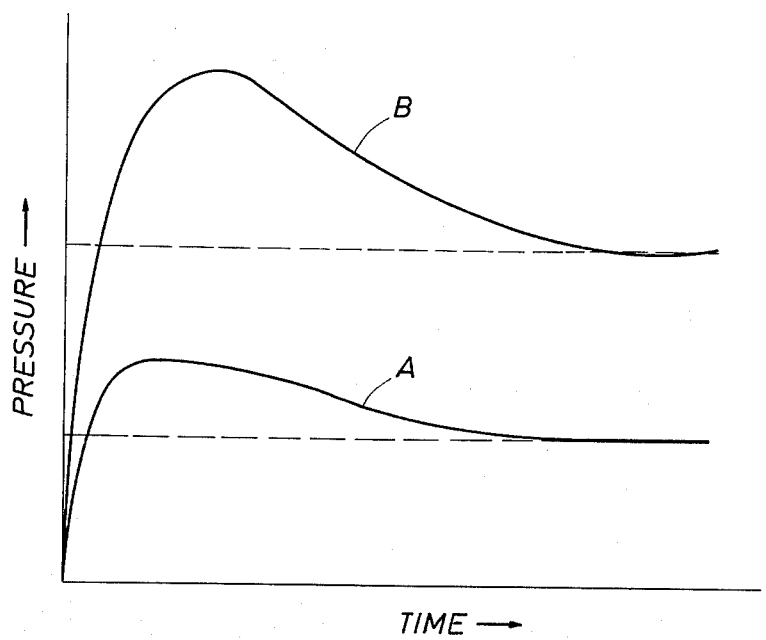
FIG. 2 is a graph relating the pressure changes within the second container to time at the time of filling according to the method of the invention.

FIG. 2, attached hereto, shows pressure/time traces within second containers being filled according to the invention. Line A shows the pressure changes when supercooled liquefied gas is introduced into a second container which already contains a quantity of liquefied gas together with its vapor. It will be seen that there is an initial small vapor generation and hence pressure increase and thereafter the pressure reduces as vapor is recondensed to a constant value. Line B shows comparable changes when supercooled liquefied gas is introduced into a second container which is initially completely empty of liquefied gas and at normal ambient temperature. The pressure within the tank is initially zero and rises rapidly as liquefied gas is introduced, a maximum value being reached after a very short time. However, hereafter the pressure reduces as vapor recondenses and the tank fills. The initial pressure rises and vapor generation within the second containers discussed above are easily contained within the said containers during the short time periods involved before the vapor recondenses, so that no removal of vapor to the first container or venting to atmosphere is necessary and filling can therefore be accomplished without any removal of vapor from the second containers.

What is claimed is:

1. A method of transferring a liquefied gas from a first container to a second container without removal of vapor from the second container which comprises the following sequential steps:
    a. cooling a multiple part conduit having a disconnectable coupling between two parts thereof by removing liquefied gas from said first container, pressurizing the removed liquefied gas and returning the pressurized liquefied gas to said first container through said conduit;
    b. breaking said conduit at the coupling thereof into first and second parts and establishing communication between said first container and said second container through the first part of the cooled conduit while closing off the second part thereof; and
    c. transferring liquefied gas under pressure from said first container to said second container through said first part of said conduit.

2. A method as in claim 1, which comprises when the desired quantity of liquefied gas has been transferred to said second container, removing said first conduit part from said second container, reuniting said first and second conduit parts, and opening the second part thereof, whereafter cooling of said conduit in accordance with step (a) of claim 1 is resumed.

3. The method as in claim 1, wherein the vapor formed in the first container is reliquefied.

4. The method as in claim 1, comprising returning part of the liquefied gas from the first part of said conduit to said first container by means of an alternate conduit.

5. The method as in claim 1, wherein the liquefied gas is selected from the group consisting of liquefied natural gas (L.N.G.), liquefied petroleum gas (L.P.G.) and liquefied hydrogen.

* * * * *